United States Patent [19]

Schneider et al.

[11] Patent Number: 5,094,338

[45] Date of Patent: Mar. 10, 1992

[54] CONVEYER DEVICE FOR BALES, SPECIFICALLY ON OR IN A BALE OR WIRE REMOVAL STATION

[75] Inventors: Walter Schneider, Heidenheim; Jorg Goetze, Witzenhausen, both of Fed. Rep. of Germany

[73] Assignee: J.M. Voith GmbH, Heidenheim, Fed. Rep. of Germany

[21] Appl. No.: 652,548

[22] Filed: Feb. 8, 1991

[30] Foreign Application Priority Data

Feb. 10, 1990 [DE] Fed. Rep. of Germany ....... 4004138

[51] Int. Cl.$^5$ ............................................. B65G 25/00
[52] U.S. Cl. .............................. 198/468.01; 198/468.6
[58] Field of Search ................. 198/468.01, 468.6, 409, 198/416, 463.4

[56] References Cited

U.S. PATENT DOCUMENTS 3,993,200 11/1976 Ide .................................. 198/468.6 X
4,998,614 3/1991 Riemenschneider et al. ... 198/463.4

*Primary Examiner*—Joseph E. Valenza
*Assistant Examiner*—Cheryl L. Gostineau
*Attorney, Agent, or Firm*—Baker & Daniels

[57] ABSTRACT

Provided is a frame with a plurality of swivel arms which supports a plurality of stops. Through the stop that is nearer to an upper preceding bale conveyer, a wastepaper bale proceeds onto a following lower support surface is such a way that wire laps surrounding the wastepaper bale are in a horizontal position. Through a second, following stop, rotation of the bale may take place as it drops from the first bale conveyor onto the following support surface, without causing the wastepaper bale to turn or topple so far that the wire laps will again have the same direction which they had on the first bale conveyor. This assures that in a following tie wire removal station, for example, the laps of the tie wires will always have the same alignment irrespective of the position of the wastepaper bales on the first conveyer belt.

15 Claims, 3 Drawing Sheets

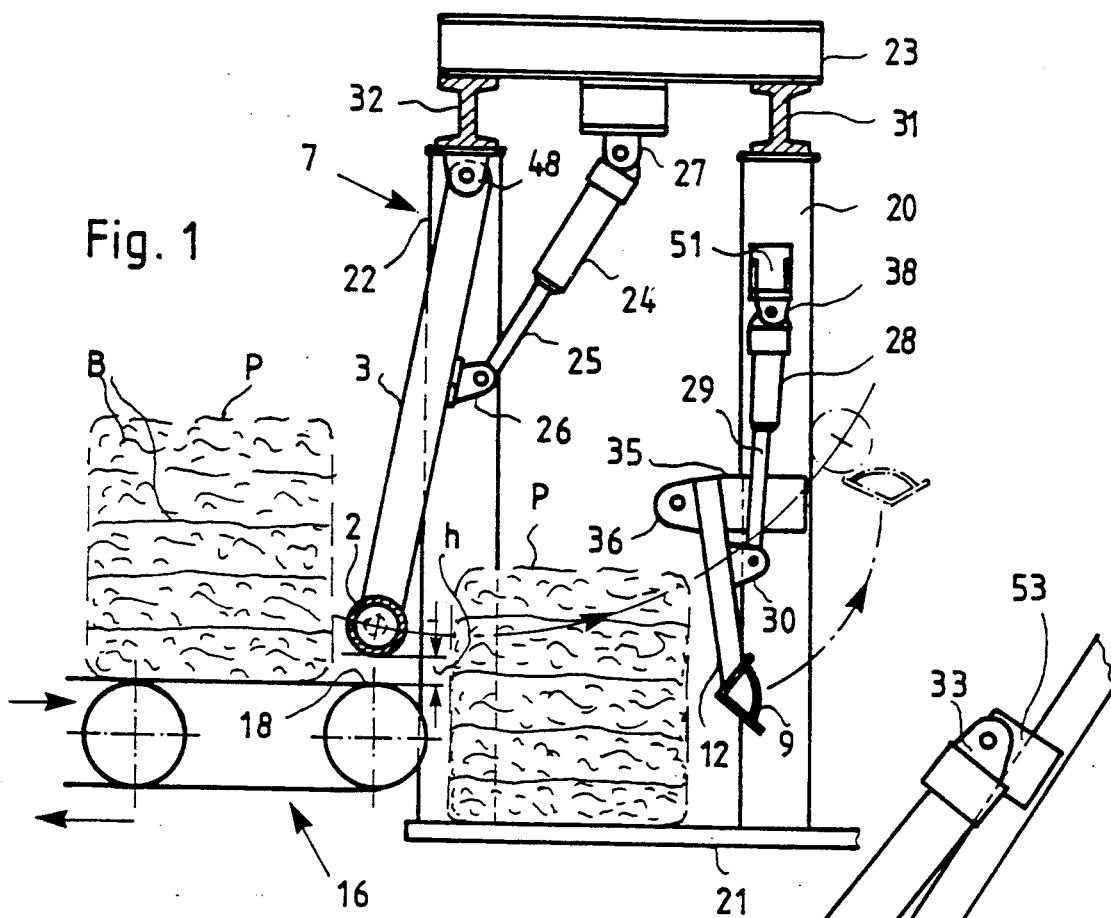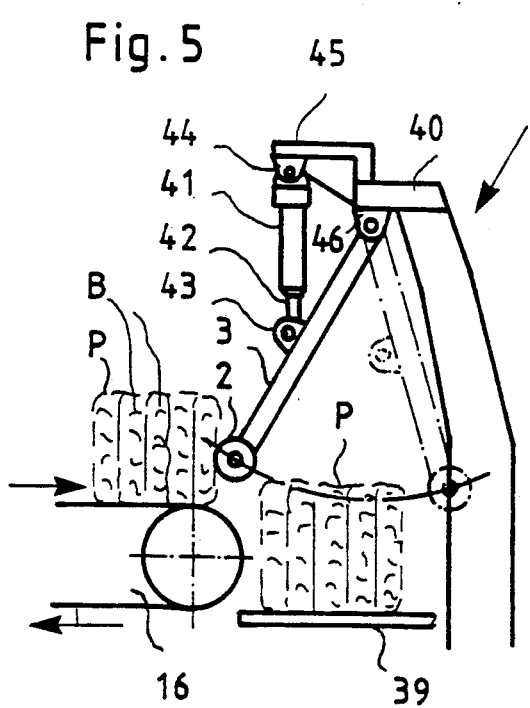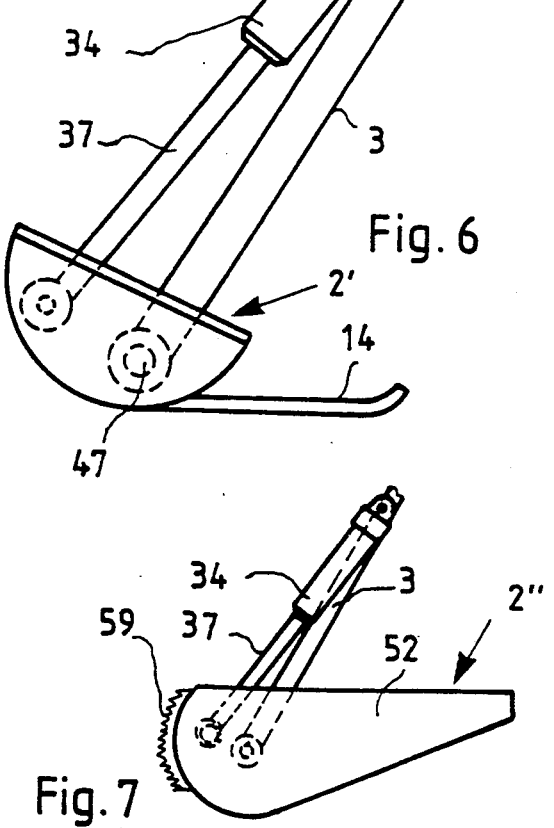

5,094,338

CONVEYER DEVICE FOR BALES, SPECIFICALLY ON OR IN A BALE OR WIRE REMOVAL STATION

BACKGROUND OF THE INVENTION

The present invention relates to a bale conveyer device and, more particularly to a bale conveyer device for wastepaper bales. The bale conveyer provides a first support surface for the wastepaper bales while another support surface for the wastepaper bales is provided behind the end of the bale conveyer. This makes it possible to sever in a suitable way the tie wires holding the bale together and to remove them, for instance by winding them up.

Generally though, the wastepaper bale must lie on the second support surface in such a way that the wire laps will have a specific alignment, i.e., all extending horizontally. The wastepaper bales are placed on the first bale conveyer by an operator, during this process though an alignment with regard to the tie wire extension is generally not possible.

The problem underlying the invention is, therefore, to provide a device in which a clear alignment of the wastepaper bales on the second support surface can be achieved regardless of the bale orientation on the first support surface.

SUMMARY OF THE INVENTION

This problem is solved by the characteristics of the present invention. An apparatus for aligning wastepaper bales includes a support surface, a bale conveyer having an upper support surface vertically spaced above the support surface, and an end area. A stop is arranged above the support surface and moveable along a forward direction corresponding to the direction of movement of the bale conveyer The stop includes an effective stop surface and a lowermost position which allows the wastepaper bale to be aligned on the following support surface with its tie wires always in the same direction.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is an elevational view of a first embodiment of the present invention;

FIG. 5 is a fragmentary, elevational view of a second embodiment of the present invention;

FIG. 6 is an enlarged fragmentary view of a modified embodiment of the present invention;

FIG. 7 is an enlarged fragmentary view of a further modified embodiment of the present invention;

Corresponding reference characters indicate corresponding parts throughout the several views. The exemplifications set out herein illustrates several preferred embodiment of the invention, and such exemplifications are not to be construed as limiting the scope of the invention in any manner.

DESCRIPTION OF THE PREFERRED EMBODIMENT

Figure 2:
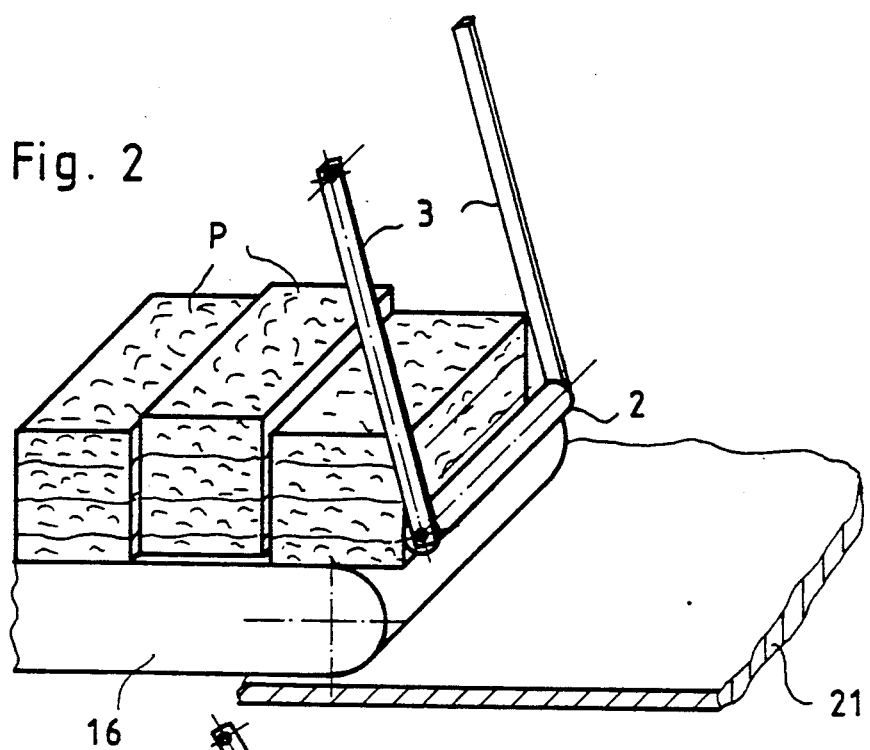
FIGS. 2 through 4, shows a schematic sequence of the wastepaper bales conveying process.

Referring to FIG. 1, a first bale conveyer 16 has a first support surface 18 while frame 7 has a second horizontal support surface 21. Bale conveyer 16 may specifically be designed as a plate conveyer. Naturally, this applies also with regard to the second support surface 21, which is arranged lower than support surface 18 of first bale conveyer 16, with both support surfaces aligned essentially horizontally. The difference in height between the two support surfaces, 18 and 21, amounts approximately to at least 25 cm, since the wastepaper bales usually have a cross section (width by height) of 1 m $\times$ 1 m. Thus, if a wastepaper bale P drops unimpededly from support surface 18 of first bale conveyer 16 down onto the following support surface 21, it will change its bearing side, i.e., it will turn once about its longitudinal axis. The following will describe how bale P can be prevented from turning about its longitudinal axis as bale P comes to rest on support surface 21. The wastepaper bale P is acted upon in such a way that it will not change its bearing side but will bear with the same side on the following support surface 21 as the preceding surface 18 of the first bale conveyer 16, as indicated in FIG. 1.

Provided for that purpose are two stops 2 and 9 which are attached to swivel arms 3 and 12 respectively supported by frame 7. The pivot axes of the swivel arms are parallel with the front edge of the first bale conveyer 18. The frame consists essentially of two vertical members 20 and 22 as well as two cross beams 31 and 32 and two longitudinal beams 23. The pivot axis of the swivel arm 3 for the first stop 2 extends through the eye plate 48 on both sides of the plate conveyer 16. The swivel arm 3 supports a stop 2 in the form of a long, horizontally arranged pipe or roll 2. The pipe may be fixedly arranged but may also be rotatably supported. The swivel path of the stop 2 is indicated by the dash-dot line and arrow up to the other limit position, which is also indicated by dash-dot line. If a wastepaper bale P arrives such that the position of the surrounding tie wires B, as illustrated in FIG. 1, is desirable, letting the first stop 2 make contact with the bale prevents it from turning onto another side as it transfers from the upper support surface 18 to the lower support surface 21 (for instance a conveyer table); i.e., the stop 2 guides it slowly from the first bale conveyer 16 onto the following support surface 21, during this process it practically always bears on the stop 2.

The difference in height h between the bottom edge or the lowest point of the effective support surface of the stop 2 relative to the support surface 18 of the bale conveyer 16—practically in the left limit position of the stop—amounts to between approximately 10 and 85 cm. The vertical plane through the pivot axis of the swivel arms in the frame 7 should be in the range between $-20$ and $+80$ cm before or after the end of the first bale conveyer 16—viewed in the feed direction—or, preferably, the horizontal spacing of the pivot axis of swivel arms 3, from the end of the bale conveyer, amounts to maximally 40 cm behind its end.

The procedure is different if the wastepaper bale P has a position such that the wire laps, as illustrated by bale P on conveyer 16 in FIG. 5, extend essentially in the vertical direction. To that end, the swivel arm 3 or its stop 2 remains in the limit position illustrated by dash-dot line in FIG. 1, in which position the preceding wastepaper bale P can be moved toward the right and out of this turning station. This same condition also applies with regard to stop 9, which is also located in the limit position indicated by dash-dot line. At the next bale P, the swivel arm is then moved, along with the stop 9, into the limit position of FIG. 1 indicated by the solid line. In this position it prevents a wastepaper bale dropping down from the first bale conveyer 16 from turning more than 90°, i.e., it causes the bale P to rest with its following side now on the second support surface 21 as shown in FIG. 1. The wire laps B now extend horizontally in this position, which is desirable, e.g., when the laps are supposed to be cut and wound off the wastepaper bale in a following wire removal station.

Figure 3:
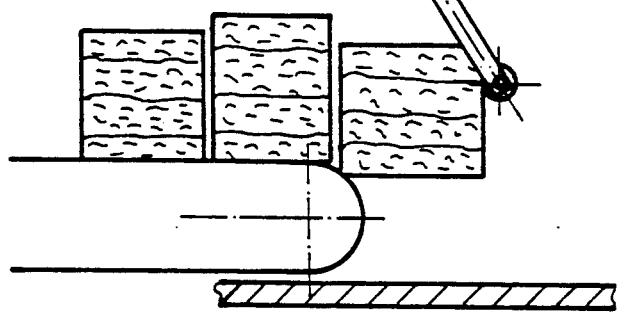
Figure 4:
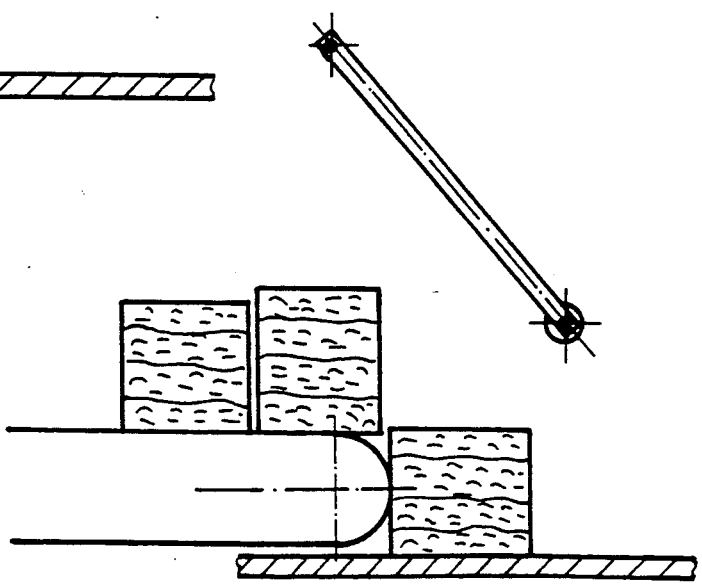

It is possible though to prevent the wastepaper bale P from turning excessively as it drops down, i.e., in other words, adapting the conveyer speed of plate belt 16 and the drop height h of the wastepaper bale makes it possible to accomplish that the bale will turn only far enough to rest on the following side. On the other hand, it is also possible, in the case of a not too greatly fluctuating bale height or bale width, that stop 2 will be sufficient to prevent in its limit position illustrated by dash-dot line the further turning of the wastepaper bale P. This is illustrated, in FIG. 5, where a successive bale conveyer 39 is arranged transverse to the preceding bale conveyer 16. In the dash-dotted position of stop 2 and its swivel arm 3', stop 2 prevents the wastepaper bale P from turning too far or toppling over as it drops down. Here, swivel arm 3' is attached to a cross beam 40 of a frame 7' by means of eye plate 46. The stroke element for swivel arm 3' is held through eye plate 44 on a console or bracket 45 which is fastened on the cross beam 40. A piston rod 42 of stroke element 41 is hinged to swivel arm 3' via eye plate 43. FIGS. 2 through 4 show the process, evidenced in a time sequence, in the case when the wastepaper bale P already has the proper position on first bale conveyer 16, when the first stop 2 goes into action.

FIG. 6 illustrates another embodiment of a single stop mechanism. In this case, stop 2' is designed as a beam with an essentially semicircular cross section. Distributed across the length of stop 2' are support stops 14 which may be designed either as rods or narrow plates. Stop 2' is rotatably or pivotally mounted on swivel arm 3 via bearing point 47. To effect a second swivel movement, a stroke element 34 is provided which by means of piston rod 37 is attached to stop 2'. Stroke element 34 is attached to swivel arm 3 by way of eye plate 33 and holder plate 53. Stop 2' may be used in the arrangement according to FIG. 1, waiving second stop 9 and swivel arm 12. In the limit position of stop 2', indicated by a dash-dot line in FIG. 1, stops 14 are then moved into a lower position by swiveling stop 2' about its pivot axis 47, so at changing heights or widths of the wastepaper bales the stops will prevent a wastepaper bale lying "incorrectly" on the first bale conveyer from turning or toppling too far.

In the case of FIG. 1, the pivot axis (at 48) of first swivel arm 3 should be located in a vertical plane whose area is contained approximately between 20 cm from the limit edge of the bale conveyer 16 and 80 cm, but preferably 40 cm, behind this limit edge. In the case of FIG. 5, the pivot axis (at 46) of swivel arm 3' may be located between 60 and 100 cm behind the limit edge of the first bale conveyer 16.

FIG. 7 shows a modification of the stop 2" of FIG. 6, featuring a single, long extension 52 which is to prevent an excessive toppling of a bale. It also shows a serrated stop surface 59 for the bale, preventing the latter from slipping uncontrollably.

Figure 8:
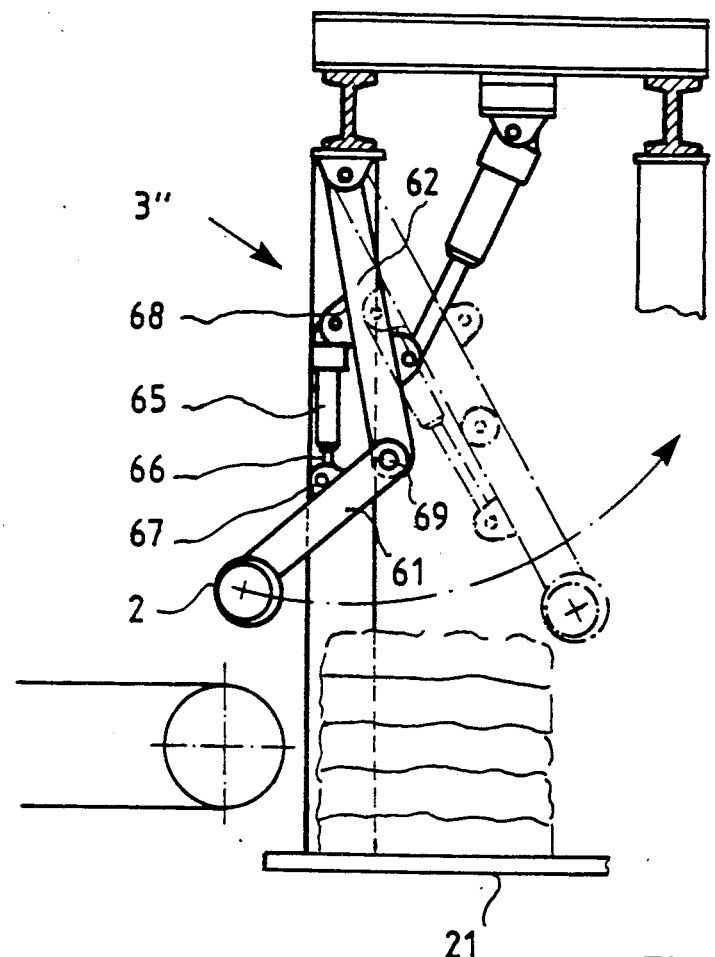
FIG. 8 is an elevational view of yet a further embodiment of the present invention.

Illustrated in FIG. 8 is another embodiment of the present invention with only a single stop in which each of its ends is attached to a swivel arm 3" consisting of two components 61 and 62 which are hinged to one another at pivot 69. A hydraulic stroke element 65 is attached on upper part 62 at bearing eye 68, and at its piston rod 66 at bearing eye 67 on lower part 61. When a toppling of the bale on table 21 is to be prevented, lower arm component 61 is swiveled into the extended position illustrated by dash-dot lines.

Figure 9:
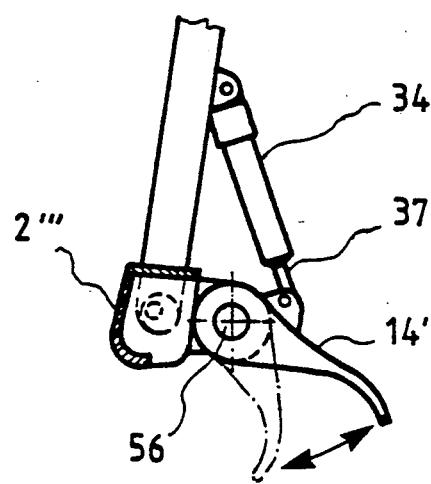
FIG. 9 is an enlarged fragmentary view of another modified embodiment of the present invention.

In FIG. 9, one or several additional stops 14', pivotable about pivot axis 56, are attached to the first (principal) stop 2''', and serve in the dash-dotted position to stop the bale against repeated toppling. Several additional stops 14', parallel with one another, may be connected with one another through rigid linkages or a rod while distributed across the length of stop 2''', which presently is bale-shaped.

Basically, the wastepaper bales P are placed on the bale conveyer 16 with their length in transverse direction of the bale conveyer (plate belt). Therefore, the length of the stops 2 and 9 or 2' should be considerably larger than the maximum length of the wastepaper bale P, which amounts to approximately 2 m. The stops will have a length approximately equal to the width of the plates 18 (generally the width of the bearing surface of the bale conveyers). The swivel arms 3 and 12 or 3' are then located sideways beside the working surface provided by the plate belts.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the claims.

What is claimed is:

1. An apparatus for aligning wastepaper bales comprising:
    a substantially horizontal support surface;
    a first bale conveyer having an upper support surface and an end area horizontally aligned with said horizontal support surface, said upper support surface being vertically spaced above said horizontal support surface a distance of at least substantially 25 cm, said conveyer being moveable in a forward direction; and
    a first stop arranged above said horizontal support surface and moveable in the forward direction, said first stop having an effective stop surface and extending in a direction transverse to said first bale conveyer, said stop having a lowermost position in which said effective stop surface is spaced above said upper support surface a distance equal to or less than about 15 cm less than the height of a wastepaper bale supported on said upper support surface.

2. The apparatus of claim 1, wherein said first stop has a limit position near said first bale conveyor corresponding to said lowermost position.

3. The apparatus of claim 2, wherein said first stop has a farthest position from said first bale conveyer such that the vertical distance between said effective stop surface and said horizontal support surface is greater than the height of a wastepaper bale on said horizontal support surface.

4. The apparatus of claim 1, further comprising first swivel arms supporting said first stop, said first swivel arms having a first pivot axis parallel to and above a limit edge of said end area of said conveyer.

5. The apparatus of claim 4, wherein said first pivot axis is in the range of 20 cm before and 80 cm beyond a vertical plane extending from the limit edge of said end area.

6. The apparatus of claim 5, wherein said first pivot axis is maximally 40 cm beyond said vertical plane.

7. The apparatus of claim 1, further comprising a second stop arranged after said first stop and moveable in the forward direction, said second stop having a lowest position such that the vertical distance between said second stop and said horizontal support surface is less than the height of a bale on said horizontal support surface.

8. The apparatus of claim 7, wherein said second stop is a horizontal elongated barrier extending transverse to the direction of movement of said first bale conveyer.

9. The apparatus of claim 8, further comprising a swivel arm attached to said second stop, said swivel arm having a second pivot axis located at a height less than the height of said first pivot axis and at a distance further from said first bale conveyer than said first pivot axis.

10. The apparatus of claim 1, further comprising first swivel arms and wherein said first stop is rotatably mounted to said first swivel arms and having an axis of rotation spaced inward of a peripheral surface of said first stop, said first stop further including stop elements extending generally perpendicular to said axis of rotation, said stop elements swivable such that at a position closest to a wastepaper bale on said first bale conveyer said stop elements are lower than said effective stop surface.

11. The apparatus of claim 10, further comprising actuator means attached to said first stop for swiveling said first stop and said stop elements connected thereto.

12. The apparatus of claim 10, further comprising:
actuator means pivotally connected at one end to said stop elements and pivotally connected at the other end to said first swivel arms for pivotally moving said stop elements, said stop elements pivotally connected to said first stop through a pivot axis parallel to the pivot axes of said first stop and said first swivel arms.

13. The apparatus of claim 1, further comprising a second bale conveyer arranged transverse to said first bale conveyer, said second bale conveyer having a support surface corresponding to said horizontal support surface.

14. The apparatus of claim 10, wherein said first swivel arms each includes:
a first articulated part connected to said first stop; and
a second articulated part pivotally connected on one end to said first articulated part, said first articulated part and said second articulated part being relatively lockable in at least two angular positions.

15. An apparatus for aligning wastepaper bales comprising:
a substantially horizontal support surface;
a first bale conveyer having an upper support surface and an end area horizontally aligned with said horizontal support surface, said upper support surface being vertically spaced above said horizontal support surface a distance of at least substantially 25 cm, said conveyer being moveable in a forward direction; and
a first stop arranged above said horizontal support surface and moveable in the forward direction, said first stop having an effective stop surface and extending in a direction transverse to said first bale conveyer, said stop having a lowermost position in which said effective stop surface is spaced above said upper support surface a distance equal to or less than about 85% of the height of a wastepaper bale supported on said upper support surface.

* * * * *